(12) United States Patent
Macedo

(10) Patent No.: US 6,780,512 B2
(45) Date of Patent: Aug. 24, 2004

(54) METHODS FOR PREPARING DECORATIVE COATINGS

(76) Inventor: Joseph Macedo, 45 Watchung Dr., Basking Ridge, NJ (US) 07920

(*) Notice: Subject to any disclaimer, the term of this patent is extended or adjusted under 35 U.S.C. 154(b) by 73 days.

(21) Appl. No.: 10/223,892

(22) Filed: Aug. 20, 2002

(65) Prior Publication Data
US 2004/0038036 A1 Feb. 26, 2004

(51) Int. Cl.$^7$ .................. B32B 27/38; B32B 27/30; B41M 5/40; B05D 3/06; B05D 1/38
(52) U.S. Cl. .................. 428/417; 428/32.39; 428/336; 428/413; 428/414; 428/415; 428/523; 427/407.2; 427/407.8; 427/410; 427/412; 427/412.1; 427/553; 427/558
(58) Field of Search .................. 428/413, 414, 428/415, 416, 417, 418, 500, 523, 29, 332, 334, 335, 336, 337, 32.39; 427/553, 557, 558, 402, 407.1, 407.2, 407.3, 408, 409, 410, 411, 412, 412.1, 412.2, 412.3, 412.4, 412.5

(56) References Cited

U.S. PATENT DOCUMENTS

| | | | |
|---|---|---|---|
| 3,860,388 A | 1/1975 | Haigh | 8/2.5 |
| 4,354,851 A | 10/1982 | Hix et al. | 8/471 |
| 4,908,345 A | 3/1990 | Egashira et al. | 503/227 |
| 5,871,824 A | 2/1999 | Bates | 427/518 |
| 6,096,388 A | 8/2000 | Bates | 427/518 |
| 6,156,420 A * | 12/2000 | Hosselbarth et al. | 428/32.39 |
| 6,242,055 B1 | 6/2001 | Neumann et al. | 427/493 |
| 6,284,327 B1 | 9/2001 | Neumann et al. | 427/493 |
| 6,340,504 B1 | 1/2002 | Neumann et al. | 427/493 |
| 6,376,135 B1 * | 4/2002 | Mehta et al. | 430/11 |

OTHER PUBLICATIONS

Internet web page entitled "Generic, Base UV Coating Formulation" (http://www.uvadditives.com/Tech%20Papers/Generic%20Base.htm).

* cited by examiner

Primary Examiner—Philip Tucker
Assistant Examiner—Michael J Feely
(74) Attorney, Agent, or Firm—White & Case LLP

(57) ABSTRACT

The invention is directed to a method for preparing a recoatable surface on a substrate. The substrate is coated with a base coat composition comprising a polyol acrylate monomer and an epoxy acrylate monomer which is subsequently cured with UV radiation. After curing, the base coat is imaged with a sublimation dye design, typically by contact with a transfer sheet. Advantageously, the imaged base coat can subsequently be coated with a top coat or stain to modify or enhance the properties or appearance of the design.

41 Claims, No Drawings

METHODS FOR PREPARING DECORATIVE COATINGS

FIELD OF THE INVENTION

The claimed invention relates to a method of preparing recoatable surfaces which have been imaged with sublimatable inks. Specifically, the claimed invention is directed to methods of forming UV-cured coatings on substrates which are then imaged with a sublimation dye. Advantageously, the imaged surface is recoatable and receptive to the application of a top coat or stain over the sublimated dye image.

BACKGROUND OF THE INVENTION

There is a discernible and growing market demand, particularly in the furniture industry, for decorated substrates that can be recoated to satisfy a manufacturing requirement or individual preference. In addition to wood, such substrates may include but are not limited to glass, plastic, metal and canvas. It is generally known that certain substrates can be decorated by applying a transfer sheet printed with a selected design, bringing the decorated transfer sheet into contact with a substrate, and by the application of heat and pressure, transferring the decoration from the transfer sheet to the surface of the substrate. It is also known that by using sublimation dyes which vaporize when heated, the decoration can be made to penetrate or bleed into the body of the substrate.

However, the surfaces of materials such as glass and wood are not as receptive as other substances, such as paper, to the printing of decorations directly onto their surfaces. Decorative elements printed directly on these types of substrates are prone to abrasion and wear. In addition, exposure of an imaged object to sunlight or UV-light can cause the sublimation dyes to fade, thereby reducing the visual attraction of the object.

In order to decrease the fading of an sublimated dye image, the surface of an object which has been subjected to sublimation can be coated with a protective layer or top coat. Alternatively, a clear film such a polypropylene film can be applied with heat and pressure to the surface of the imaged article. However, applying such a coating requires an additional processing step, which increases costs and manufacturing cycle times.

In accordance with U.S. Pat. No. 6,242,055, a radiation curable coating containing compounds which provide UV protection is applied to the surface of a substrate. The preferred coating is a urethane acrylate/polyester acrylate blend with additives such as UV absorbers and hindered amine light stabilizers. The radiation curable coating is subjected to a curing step with an electron beam, ultraviolet radiation beam or both. Subsequently, a sublimation ink is transferred to the radiation-cured coating.

Since it is the express purpose of U.S. Pat. No. 6,242,055 to eliminate the addition of a clear film coating over the sublimated image, there is no disclose or suggestion of the desirability of applying an additional top coat or layer to further protect or alter the final appearance of the imaged article. As such, there is no appreciation by U.S. Pat. No. 6,242,055 of the properties and composition of a UV curable film composition that both accepts sublimatable inks and is afterwards receptive to subsequent finishes or stains altering or enhancing the imaged surface.

Therefore, there is a continuing need to prepare UV stabilized substrates that are capable of accepting sublimatable inks wherein the surface of the imaged article is advantageously receptive to a subsequent stain or top coat which adheres uniformly and does not run off. As a result, it is possible to adjust the final coloration or appearance of the imaged article to satisfy limitless commercial applications and personal preferences. None of the known methods of coating substrates permit the ready preparation of a transparent, UV-cured coating which is imaged by a sublimation dye and which is receptive to a top coat or stain.

SUMMARY OF THE INVENTION

The present invention relates to a method for preparing a recoatable substrate which has a sublimation dye image transferred into the surface of the substrate and which is receptive to a subsequent top coating. By recoatable, it is meant that the surface of the cured and imaged article will accept a further top coating step such as an additional finish or strain which adheres uniformly to the imaged surface and does not run off.

It has been surprising discovered that a recoatable surface is obtained when a base coat composition comprising a polyol acrylate monomer and an epoxy acrylate monomer is applied to a substrate and cured by UV radiation. The base coat material penetrates and tightly bonds with the surface of the substrate after curing by UV radiation. The base coat is subsequently imaged with a sublimation dye design. The imaged design does not need to extend over the entire surface of the article and, therefore, unimaged areas remain transparent and showing the natural surface and coloration of the substrate. The imaged base coat can optionally be stained or colored with a top coat after the sublimation dye design has been transferred to the base coat.

Substrates which can be used with the present invention include, but are not limited to wood, glass, plastic, canvas, and non-woven polyester. Wooden substrates formed from natural wood, engineered wood, untreated or treated wood, particle board, and pressed wood may all be successfully coated with the claimed method. In accordance with the claimed invention, even substances such as glass which are not typically considered porous can be successfully coated and imaged. Glass or plastic substrates which are coated and imaged retain their light-transmitting properties and thereby permit a substantial amount of light to pass through the glass. The present invention has particular application to the furniture and decorative arts industries.

DETAILED DESCRIPTION OF THE INVENTION

In accordance with one embodiment of the invention, the polyol acrylate and epoxy acrylate components of the base coating composition are present in the following ranges:

19–75% polyol acrylate monomer; and

25–60% epoxy acrylate monomer.

The remainder of the composition can be inert or filler, provided that any such materials do not interfere with the process of obtaining a clear and transparent base coating which is receptive to the sublimatable dyes and a subsequent top coat.

The polyol acrylate monomer may be a diol diacrylate monomer such as dipropylene glycol diacrylate, a triol triacrylate such as trimethylolpropane triacrylate, or a combination thereof.

In a further embodiment of the invention, the composition may optionally comprise one or more components selected from ketal, e.g., 1–10% ketal; aromatic ketone, e.g., 1–6% aromatic ketone; silicone polymer, e., 1–10% silicone polymer; and vinyl monomer, e.g., 2–12% vinyl monomer.

The ketal may be an aliphatic ketal, an aromatic ketal, or an aliphatic(aromatic) ketal such as benzyl dimethyl ketal. The aromatic ketone may be benzophenone or a substituted benzophenone. The silicone polymer may be a polysiloxane copolymer. The vinyl monomer may be an alkyl monomer such as methyl butyl methacrylate, or an aromatic monomer such as methyl styrene.

The composition may optionally comprise additional components which enhance the properties of the cured or uncured base coating material. For example, these components may comprise aliphatic rosin esters in the range of 1–8%; amine acrylates in the range of 3–8%; and inorganic silicates in the range of 0–30%.

Examples of two base coating formulations in accordance with the present invention are provided in the tables below. Either of these compositions can be applied to a substrate and then cured to obtain the base coat in a single step. Alternatively, one formulation can be applied to the substrate, cured, and then the same or different formulation can be applied sequentially to the same object and cured. In this manner, the base coat can be built up from a plurality of separate coating steps.

| % Wt | Component |
| --- | --- |
| Formulation #1 | |
| 20–30 | Trimethylolpropane triacrylate |
| 6–15 | Tripropylene glycol diacrylate |
| 4–12 | Dipropylene glycol diacrylate |
| 30–60 | Acrylated epoxy |
| 3–10 | Benzyl dimethyl ketal |
| 3–8 | Acrylated amine |
| 1–5 | Benzophenone |
| 1–5 | Modified polysiloxane copolymer |
| 1–10 | Aluminum silicate |
| 6–20 | Magnesium silicate |
| 2–10 | Methyl butyl methacrylate |
| 1–8 | Aliphatic rosin ester |
| Formulation #2 | |
| 5–25 | Trimethylolpropane triacrylate |
| 5–15 | Tripropylene glycol diacrylate |
| 4–10 | Dipropylene glycol diacrylate |
| 5–25 | 1,6-Hexanediol diacrylate |
| 25–50 | Acrylated epoxy |
| 2–8 | Benzyl dimethyl ketal |
| 2–6 | Benzophenone |
| 2–10 | Modified polysiloxane copolymer |
| 2–10 | Methyl butyl methacrylate |
| 0–25 | Amorphous silica |
| 0–2 | Methyl styrene |

Although the base coat composition will typically contain colorless components and produce a colorless and transparent coat after curing, the composition may optionally comprise a colorant or dye, such that after curing, the base coat will be tinted or dyed.

The base coat composition is cured using UV-radiation. The UV radiation can be obtained from any source. In practice, it is convenient for the UV radiation source to be a UV lamp or a UV curing oven. Curing times for the base coat composition will vary depending upon the thickness of the base coat and the nature of the substrate. Typical UV curing conditions may range from 200 watts/inch to 700 watts/inch in an air or nitrogen atmosphere.

After curing, the composition yields a clear, transparent, durable, and recoatable base coat. The durability of the base coat protects the surface of the article from damage due to exposure to the elements. Depending upon the particular composition of the base coat and cure conditions, different types of finishes such as matte, glossy, and high gloss base coats can be obtained.

The base coat is subsequently imaged with a sublimation dye design to provide the imaged article. Sublimation dye designs may be applied to the cured base coat using techniques known in the art. For example, U.S. Pat. No. 4,354,851; U.S. Pat. No. 4,908,345; and U.S. Pat. No. 3,860,388 disclose methods for producing decorated substrates using dye sublimation techniques. The transfer sheets containing the sublimatable ink and the design to be imaged may also be prepared using known techniques. Typical conditions for the transfer of a sublimation dye design from a transfer sheet are 300–500° F. and 20–60 psi, and typical contact times between the transfer sheet and the substrate during the dye transfer step may range from 5 seconds to 300 seconds. For certain applications, conditions outside of these ranges may be found to be more appropriate. The imaging step can be repeated in order to apply a plurality of designs to the base coat.

Because the cured base coat is smooth and has excellent adhesion to the substrate, a separate fill coat or sanding step to provide a smooth base is unnecessary. For example, the base coat can be applied to a substrate which has not been mechanically smoothed or planed, and which has small imperfections on its surface. In this manner, manufacturing costs are reduced by elimination of these additional processing steps.

The recoatable base coat permits the application and adhesion of an optional top coat. The top coat can be any type of material which protects, colors, or enhances the surface appearance of the article. For example, the top coat can be a tinted polyester, epoxy, conversion lacquer, nitrocellulose, urethane, acrylic, paint, shellac, varnish, enamel, organic-based or water-based material.

Additional examples of materials that can be applied as top coats are: synthetic penetrating oils; nitrocellulose transparent lacquers; acrylic transparent lacquers and latexes; and postcatalyzed conversion varnishes, polyesters, and polyurethanes. These top coats can be cured in any conventional manner, such as ambient temperature, low bake or high bake temperatures, radiation, or UV curing. Although not required, the top coat material can optionally comprise compounds which inhibit fading of the underlying sublimated dye image.

The color of any stain applied to the base coat will, of course, depend upon the particular application. For example, if a light-colored wooden article is desired, no top coat may need to be applied to a base-coated and imaged object. Alternatively, if a darker wood color is desired, after curing and imaging, a chestnut or mahogany stain can be applied to color the wooden article and thereby obtain a darker wood. In certain instances, the color of the stain may be sufficiently intense so as to penetrate the base coat and reach the surface of the underlying substrate.

The base coat and the optional top coat may be any thickness which would depend upon the amount of the particular coating material applied and the porosity of the substrate. For example, wooden substrates which are very porous may require a base coat thickness of about 3–6 mils. Less porous materials such as glass may require a base coat which is only 0.5–1.0 mils thick. In practice, the thickness of the base coat and top coat may independently range from 0.1 mils to 10 mils.

Advantageously, the claimed invention provides a method of preparing a ultraviolet stabilized substrate that is particularly suited to received a sublimatable dye image and a subsequent top coating layer which enhances or alters the appearance of the imaged surface. Another advantage of the claimed process is that only one base coating step and one top coating step (if used) are necessary. However, as previously mentioned, for certain applications, it may be advantageous to apply a plurality of top coats, a plurality of base coats, or both, to obtain a particular coating thickness or property.

Numerous modifications and variations of the present invention are possible in light of the above teachings, and therefore, within the scope of the appended claims, the invention may be practiced otherwise than as particularly described.

What is claimed is:

1. A method of preparing a recoatable substrate, the method comprising the steps of:
    (a) applying a base coat to at least one surface of the substrate, wherein the base coat is a composition comprising a polyol acrylate monomer and an epoxy acrylate monomer and wherein the components of the composition are in the range of:
        19–75 wt % polyol acrylate monomer; and
        25–60 wt % epoxy acrylate monomer;
    (b) curing the base coat with UV radiation; and
    (c) transferring a sublimatable dye to the cured base coat.
2. The method according to claim 1, wherein the composition further comprises ketal, aromatic ketone, silicone polymer, and vinyl monomer.
3. The method according to claim 2, wherein the components of the composition are in the range of:
    1–10 wt % ketal;
    1–6 wt % aromatic ketone;
    1–10 wt % silicone polymer; and
    2–12 wt % vinyl monomer.
4. The method according to claim 2, wherein the ketal is an aliphatic ketal, an aromatic ketal, or an aliphatic (aromatic) ketal.
5. The method according to claim 2, wherein the aromatic ketone is benzophenone.
6. The method according to claim 2, wherein the silicone polymer is a polysiloxane copolymer.
7. The method according to claim 2, wherein the vinyl monomer is an alkyl or aromatic monomer.
8. The method according to claim 1, wherein the composition further comprises one or more compounds selected from the group consisting of aliphatic rosin ester, amine acrylate, and inorganic silicate.
9. The method according to claim 8, wherein the composition further comprises one or more compounds selected from the group consisting of:
    aliphatic rosin ester in the range of 1–8 wt %;
    amine acrylate in the range of 3–8 wt %; and
    inorganic silicate in the range of 0–30 wt %.
10. The method according to claim 8, wherein the inorganic silicate is aluminum silicate, magnesium silicate, or silica.
11. The method according to claim 1, wherein the polyol acrylate monomer is a diol diacrylate or a triol triacrylate.
12. The method according to claim 1, father comprising the step of applying a top coat onto the substrate.
13. The method according to claim 12, wherein the top coat is transparent.
14. The method according to claim 12, wherein the thickness of the top coat is in the range of 0.1 mils to 10 mils.
15. The method according to claim 12, wherein the top coat is a polyester, epoxy, conversion lacquer, waterborne, nitrocellulose, urethane, acrylic, paint, shellac, vanish, enamel, synthetic penetrating oil, nitrocellulose transparent lacquer, acrylic transparent lacquer or latex; or postcatalyzed conversion varnish, polyester or polyurethane.
16. The method according to claims 12, wherein the step of applying a top coat is repeated.
17. The method according to claim 1, wherein the substrate is selected from the group consisting of wood, glass, plastic, canvas and non-woven polyester.
18. The method according to claim 17, wherein the wood is natural wood, engineered wood, untreated wood, particle board, or pressed wood.
19. The method according to claim 1, wherein the source of the UV radiation is a UV lamp.
20. The method according to claim 1, wherein the thickness of the base coat is in the range of 0.1 mils to 10 mils.
21. A method of preparing a recoatable substrate, the method comprising the steps of:
    (a) applying a base coat to at least one surface of the substrate, wherein the base coat is a composition comprising a polyol acrylate monomer and epoxy acrylate monomer;
    (b) curing the base coat with UV radiation;
    (c) transferring a sublimatable dye to the cured base coat; and
    (d) applying a top coat onto the substrate.
22. The method according to claim 21, wherein the composition further comprises ketal, aromatic ketone, silicone polymer, and vinyl monomer.
23. The method according to claim 22, wherein the components of the composition are in the range of:
    1–10% ketal;
    1–6% aromatic ketone;
    1–10% silicone polymer; and
    2–12% vinyl monomer.
24. The method according to claim 22, wherein the ketal is an aliphatic ketal, an aromatic ketal, or an aliphatic (aromatic) ketal.
25. The method according to claim 22, wherein the aromatic ketone is benzophenone.
26. The method according to claim 22, wherein the silicone polymer is a polysiloxane copolymer.
27. The method according to claim 22, wherein the vinyl monomer is an alkyl or aromatic monomer.
28. The method according to claim 21, wherein the composition further comprises one or more compounds selected from the group consisting of aliphatic rosin ester, amine acrylate, and inorganic silicate.
29. The method according to claim 28, wherein the composition further comprises one or more compounds selected from the group consisting of:
    aliphatic rosin ester in the range of 1–8 wt %;
    amine acrylate in the range of 3–8 wt %; and
    inorganic silicate in the range of 0–30 wt %.
30. The method according to claim 28, wherein the inorganic silicate is aluminum silicate, magnesium silicate, or silica.

31. The method according to claim 21, wherein the components of the composition are in the range of:

19–75 wt % polyol acrylate monomer; and

25–60 wt % epoxy acrylate monomer.

32. The method according to claim 21, wherein the polyol acrylate monomer is a diol acrylate or a triol triacrylate.

33. The method according to claim 21, wherein the top coat is transparent.

34. The method according to claim 21, wherein the thickness of the top coat is in the range of 0.1 mils to 10 mils.

35. The method according to claim 21, wherein the top coat is a polyester, epoxy, conversion lacquer, waterborne, nitrocellulose, urethane, acrylic, paint, shellac, varnish, enamel, synthetic penetrating oil, nitrocellulose transparent lacquer, acrylic transparent lacquer or latex; or postcatalyzed conversion varnish, polyester or polyurethane.

36. The method according to claim 21, wherein the step of applying a top coat is repeated.

37. The method according to claim 21, wherein the substrate is selected from the group consisting of wood, glass, plastic, canvas and a non-woven polyester.

38. The method according to claim 37, wherein the wood is natural wood, engineered wood, untreated wood, particle board, or pressed wood.

39. The method according to claim 21, wherein the source of the UV radiation is a UV lamp.

40. The method according to claim 21, wherein the thickness of the base coat is in the range of 0.1 mils to 10 mils.

41. An article prepared according to one of claims 1–8, 3–20, or 21–40.

* * * * *

UNITED STATES PATENT AND TRADEMARK OFFICE
CERTIFICATE OF CORRECTION

PATENT NO. : 6,780,512 B2
DATED : August 24, 2004
INVENTOR(S) : Joseph Macedo

It is certified that error appears in the above-identified patent and that said Letters Patent is hereby corrected as shown below:

Column 6,
Line 1, "father" should read -- further --.

Column 8,
Lines 13-14, "claims 1-8, 3-20, or 21-40" should read -- claims 1-40 --.

Signed and Sealed this

Thirtieth Day of November, 2004

JON W. DUDAS
*Director of the United States Patent and Trademark Office*